United States Patent
Kim et al.

(10) Patent No.: US 12,382,996 B2
(45) Date of Patent: Aug. 12, 2025

(54) AEROSOL GENERATING DEVICE AND CONTROLLING METHOD THEREOF

(71) Applicant: KT&G CORPORATION, Daejeon (KR)

(72) Inventors: Dong Sung Kim, Seoul (KR); Sang Kyu Park, Seoul (KR)

(73) Assignee: KT&G CORPORATION, Daejeon (KR)

( * ) Notice: Subject to any disclaimer, the term of this patent is extended or adjusted under 35 U.S.C. 154(b) by 202 days.

(21) Appl. No.: 17/624,924

(22) PCT Filed: Jul. 7, 2021

(86) PCT No.: PCT/KR2021/008662
§ 371 (c)(1),
(2) Date: Jan. 5, 2022

(87) PCT Pub. No.: WO2022/010261
PCT Pub. Date: Jan. 13, 2022

(65) Prior Publication Data
US 2022/0264956 A1    Aug. 25, 2022

(30) Foreign Application Priority Data
Jul. 8, 2020    (KR) .................. 10-2020-0084347

(51) Int. Cl.
A24F 40/53    (2020.01)
A24F 40/51    (2020.01)
A24F 40/65    (2020.01)

(52) U.S. Cl.
CPC .............. *A24F 40/53* (2020.01); *A24F 40/51* (2020.01); *A24F 40/65* (2020.01)

(58) Field of Classification Search
CPC ........... A24F 40/53; A24F 40/51; A24F 40/65
See application file for complete search history.

(56) References Cited

U.S. PATENT DOCUMENTS

| | | | |
|---|---|---|---|
| 10,327,479 B2 | 6/2019 | Popplewell et al. | |
| 10,368,583 B2 | 8/2019 | Takeuchi et al. | |
| 10,398,175 B2 | 9/2019 | Thorens | |
| 10,609,956 B2 | 4/2020 | Takeuchi et al. | |

(Continued)

FOREIGN PATENT DOCUMENTS

| | | |
|---|---|---|
| CN | 105491898 A | 4/2016 |
| CN | 106455709 A | 2/2017 |

(Continued)

OTHER PUBLICATIONS

Office Action dated Apr. 1, 2022, issued in Korean Application No. 10-2020-0084347.

(Continued)

*Primary Examiner* — Michael H. Wilson
*Assistant Examiner* — Jennifer A Kessie
(74) *Attorney, Agent, or Firm* — Sughrue Mion, PLLC

(57) ABSTRACT

An aerosol generating device includes an inhalation sensor configured to detect user's inhalation, and a controller configured to compare first inhalation data obtained from the inhalation sensor with second inhalation data stored beforehand to perform user authentication according to a comparison result. Therefore, unauthorized use by an unauthorized user or a minor may be prevented.

11 Claims, 15 Drawing Sheets

(56) References Cited

U.S. PATENT DOCUMENTS

| | | | |
|---|---|---|---|
| 10,925,316 B2 | 2/2021 | Batista et al. | |
| 2014/0096782 A1 | 4/2014 | Ampolini et al. | |
| 2015/0181945 A1* | 7/2015 | Tremblay | A24F 40/60 |
| | | | 131/328 |
| 2016/0029697 A1 | 2/2016 | Shafer | |
| 2017/0042252 A1 | 2/2017 | Takeuchi et al. | |
| 2017/0303593 A1 | 10/2017 | Cameron et al. | |
| 2017/0318861 A1 | 11/2017 | Thorens | |
| 2018/0160734 A1 | 6/2018 | Batista et al. | |
| 2019/0053540 A1 | 2/2019 | Baker et al. | |
| 2019/0357598 A1* | 11/2019 | Qiu | A61B 5/682 |
| 2019/0380389 A1 | 12/2019 | Hong et al. | |
| 2020/0000143 A1 | 1/2020 | Anderson et al. | |
| 2022/0151300 A1* | 5/2022 | Davidson | G16H 20/10 |
| 2023/0292846 A1 | 9/2023 | Henry, Jr. et al. | |

FOREIGN PATENT DOCUMENTS

| | | |
|---|---|---|
| CN | 106455716 A | 2/2017 |
| CN | 106998818 A | 8/2017 |
| JP | 2017-538408 A | 12/2017 |
| JP | 2018-520663 A | 8/2018 |
| JP | 2020-513851 A | 5/2020 |
| KR | 10-2016-0040444 A | 4/2016 |
| KR | 10-2018-0015622 A | 2/2018 |
| KR | 10-2018-0085339 A | 7/2018 |
| KR | 10-1907769 B1 | 10/2018 |
| KR | 10-2061240 B1 | 12/2019 |
| KR | 10-2020-0004694 A | 1/2020 |
| WO | 2014/150704 A2 | 9/2014 |
| WO | 2015/167000 A1 | 11/2015 |
| WO | 2019/104223 A1 | 5/2019 |
| WO | 2019/129868 A1 | 7/2019 |
| WO | 2019/173923 A1 | 9/2019 |
| WO | 2020/227284 A1 | 11/2020 |

OTHER PUBLICATIONS

International Search Report of PCT/KR2021/008662 dated Oct. 22, 2021 [PCT/ISA/210].
Written Opinion of PCT/KR2021/008662 dated Oct. 22, 2021 [PCT/ISA/237].
Office Action dated Nov. 29, 2022 from the Japanese Patent Office in JP Application No. 2022-503944.
Extended European Search Report issued Jul. 19, 2022 in European Application No. 21834697.1.
Chinese Office Action dated May 14, 2024 in Application No. 202180005516.3.
European Office Action dated Mar. 7, 2024 in Application No. 21 834 697.1.
Communication dated May 20, 2025, issued in Japanese Application No. 2023-135926.

\* cited by examiner

AEROSOL GENERATING DEVICE AND CONTROLLING METHOD THEREOF

CROSS REFERENCE TO RELATED APPLICATIONS

This application is a National Stage of International Application No. PCT/KR2021/008662 filed on Jul. 7, 2021, claiming priority based on Korean Patent Application No. 10-2020-0084347 filed on Jul. 8, 2020.

TECHNICAL FIELD

One or more embodiments of the present disclosure relate to an aerosol generating device and a controlling method thereof, and more particularly, to an aerosol generating device capable of performing user authentication.

BACKGROUND ART

Lately, people are taking a greater interest in a method of overcoming the shortcomings of traditional cigarettes. For example, there is growing demand for an aerosol generating device that generates an aerosol by heating an aerosol generating material in cigarettes or liquid storages without combustion.

DISCLOSURE OF INVENTION

Technical Problem

In general, an aerosol generating device operates according to a user input of simply pressing a button. Therefore, the aerosol generating device may be abused by an unauthorized user (e.g., a minor).

In this regard, there is a need for an aerosol generating device capable of preventing unauthorized use.

The technical problems of the present disclosure are not limited to the above-described description, and other technical problems may be derived from the embodiments to be described hereinafter.

Solution to Problem

According to one aspect of the present disclosure, an aerosol generating device includes an inhalation sensor configured to detect user's inhalation, and a controller configured to compare first inhalation data obtained from the inhalation sensor with second inhalation data stored beforehand and perform user authentication according to a comparison result.

According to another aspect of the present disclosure, a method of controlling an aerosol generating device includes obtaining first inhalation data from an inhalation sensor configured to detect user's inhalation, comparing the first inhalation data with second inhalation data stored beforehand, and performing user authentication according to a comparison result.

Advantageous Effects of Invention

The aerosol generating device according to embodiments of the present disclosure may prevent unauthorized use by an unauthorized user or a minor.

In addition, the aerosol generating device may enhance device security by restricting an operation of the aerosol generating device by the unauthorized user.

Embodiments of the present disclosure are not limited thereto. It is to be appreciated that other embodiments will be apparent to those skilled in the art from consideration of the specification and the accompanying drawings of the present disclosure described herein.

MODE FOR THE INVENTION

Figure 1:
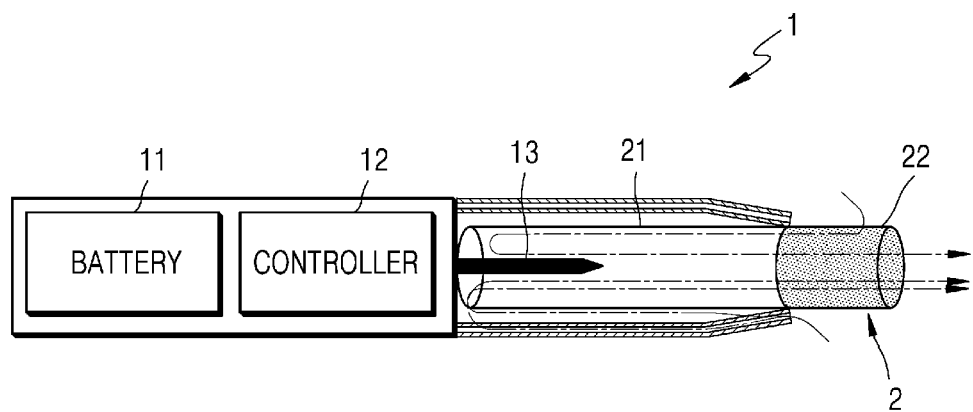
FIGS. 1 to 3 are diagrams illustrating examples in which a cigarette is inserted into an aerosol generating device.

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. Hereinafter, embodiments of the present disclosure will be described in detail with reference to the drawings. Hereinafter, embodiments of the present disclosure will be described in detail with reference to the drawings.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

The term "cigarette" (i.e., when used alone without a modifier such as "general," "traditional," or "combustive") may refer to any article which has a shape similar to a traditional combustive cigarette. This cigarette may contain an aerosol generating material that generates aerosols by operation (e.g., heating) of an aerosol generating device. Alternatively, the cigarette may not include an aerosol generating material and delivers an aerosol generated from another article (e.g., cartridge) installed in the aerosol generating device.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

The term "user authentication" may refer to a procedure to verify an authorized user of an aerosol generating device. For example, the user authentication may refer to age verification or adult authentication. Here, the term "adult" may refer to a person who satisfies the minimum smoking age requirement for purchasing or using tobacco products. The minimum smoking age may vary from country to country. For example, in South Korea, those who are 19 years old or older are considered adults. age verification. Also, the user authentication may refer to identity verification for verifying the owner of the aerosol generating device. Hereinafter, the term "user authentication" may include the age verification process and the identity verification process.

Hereinafter, embodiments of the present disclosure will be described in detail with reference to the drawings.

Figure 2:
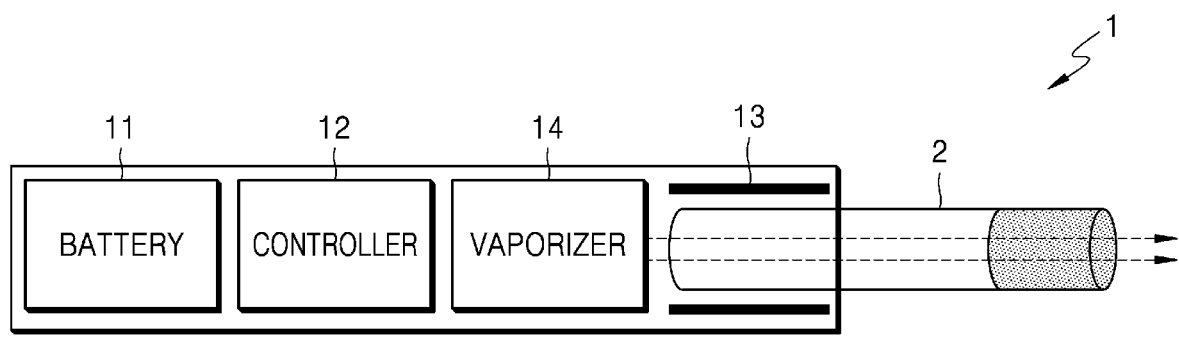
Figure 3:
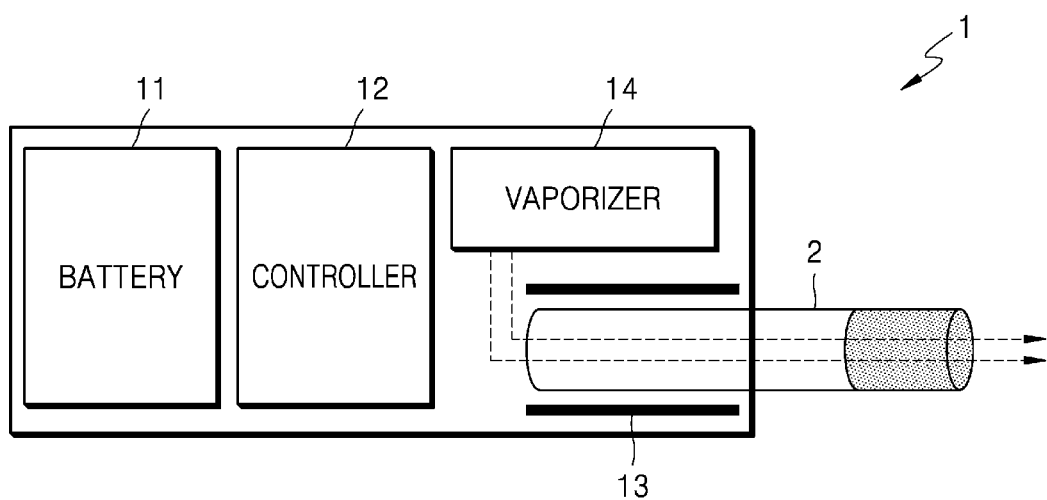

FIGS. 1 through 3 are diagrams showing examples in which a cigarette is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 through 3. Also, FIGS. 2 and 3 illustrate that the aerosol generating device 1 includes the heater 13. However, as necessary, the heater 13 may be omitted.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 2 illustrates that the battery 11, the controller 12, the vaporizer 14, and the heater 13 are arranged in series. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate aerosol. The aerosol generated by the heater 13 and/or the vaporizer 14 is delivered to a user by passing through the cigarette 2. As necessary, even when the cigarette 2 is not inserted into the aerosol generating device 1, the aerosol generating device 1 may heat the heater 13.

The battery 11 supplies power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1.

The controller 12 may generally control operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette is inserted into the aerosol generating device 1, the heater 13 may be located outside the cigarette. Thus, the heated heater 13 may increase a temperature of an aerosol generating material in the cigarette.

The heater 13 may include an electro-resistive heater. For example, the heater 13 may include an electrically conductive track, and the heater 13 may be heated when currents flow through the electrically conductive track. However, the heater 13 is not limited to the example described above and may include any other heaters which may be heated to a desired temperature. Here, the desired temperature may be pre-set in the aerosol generating device 1 or may be set by a user.

As another example, the heater 13 may include an induction heater. In detail, the heater 13 may include an electrically conductive coil for heating a cigarette in an induction heating method, and the cigarette may include a susceptor which may be heated by the induction heater. For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette to be delivered to the user. For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14 or may be formed integrally with the vaporizer 14. For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated. For example, the vaporizer 14 may be referred to as a cartomizer or an atomizer, but it is not limited thereto.

The aerosol generating device 1 may further include general-purpose components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor (a puff detecting sensor, a temperature detecting sensor, a cigarette insertion detecting sensor, etc.). Also, the aerosol generating device 1 may be formed as a structure that, even when the cigarette 2 is inserted into the aerosol generating device 1, may introduce external air or discharge internal air.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

A cigarette 2 may be similar to a general combustive cigarette. For example, the cigarette 2 may be divided into a first portion including an aerosol generating material and a second portion including a filter, etc. Alternatively, the second portion of the cigarette 2 may also include an aerosol generating material. For example, an aerosol generating material made in the form of granules or capsules may be inserted into the second portion.

The first portion may be completely inserted into the aerosol generating device 1, and the second portion may be exposed to the outside. Alternatively, only a portion of the first portion may be inserted into the aerosol generating device 1, or the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage formed in the aerosol generating device 1 may be adjusted by the user. Accordingly, the amount of smoke and a smoking impression may be adjusted by the user. As another example, the external air may flow into the cigarette 2 through at least one hole formed in a surface of the cigarette 2.

Hereinafter, examples of the cigarette 2 will be described with reference to FIGS. 4 and 5.

Figure 4:
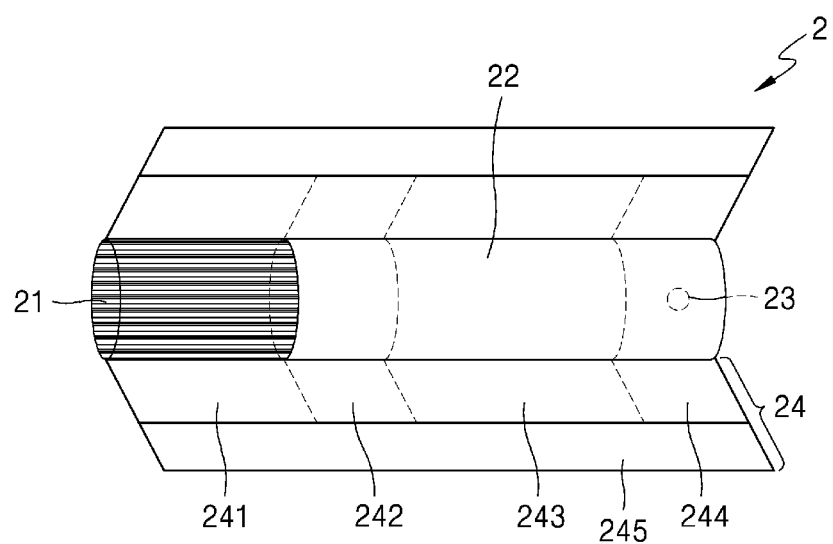
FIGS. 4 to 5 are diagrams illustrating examples of a cigarette.
Figure 5:
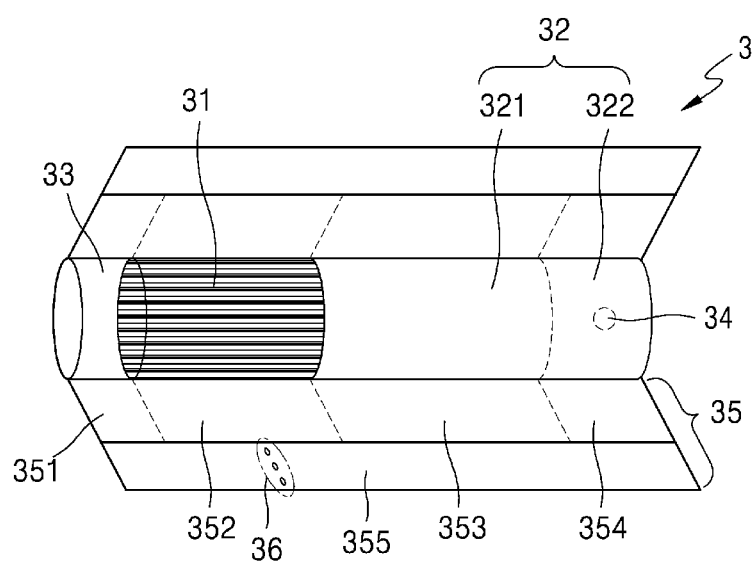

FIGS. 4 and 5 illustrate examples of the cigarette.

Referring to FIG. 4, the cigarette 2 may include a tobacco rod 21 and a filter rod 22. The first portion described above with reference to FIGS. 1 through 3 may include the tobacco rod 21, and the second portion may include the filter rod 22.

FIG. 4 illustrates that the filter rod 22 includes a single segment. However, the filter rod 22 is not limited thereto. In other words, the filter rod 22 may include a plurality of segments. For example, the filter rod 22 may include a segment configured to cool an aerosol and a segment configured to filter a certain component included in the aerosol. Also, as necessary, the filter rod 22 may further include at least one segment configured to perform other functions.

The cigarette 2 may be packaged by at least one wrapper 24. The wrapper 24 may have at least one hole through which external air may be introduced or internal air may be discharged. For example, the cigarette 2 may be packaged by one wrapper 24. As another example, the cigarette 2 may be doubly packaged by two or more wrappers 24. For example, the tobacco rod 21 may be packaged by a first wrapper 241, and the filter rod 22 may be packaged by wrappers 242, 243, 244. Also, the entire cigarette 2 may be repackaged by a single wrapper 245. When the filter rod 22 includes a plurality of segments, each segment may be packaged by wrappers 242, 243, 244.

The tobacco rod 21 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21 may include other additives, such as flavors, a wetting agent, and/or organic acid. Also, the tobacco rod 21 may include a flavored liquid, such as menthol or a moisturizer, which is injected to the tobacco rod 21.

The tobacco rod 21 may be manufactured in various forms. For example, the tobacco rod 21 may be formed as a sheet or a strand. Also, the tobacco rod 21 may be formed as a pipe tobacco, which is formed of tiny bits cut from a tobacco sheet. Also, the tobacco rod 21 may be surrounded by a heat conductive material. For example, the heat-conducting material may be, but is not limited to, a metal foil such as aluminum foil. For example, the heat conductive material surrounding the tobacco rod 21 may uniformly distribute heat transmitted to the tobacco rod 21, and thus, the heat conductivity applied to the tobacco rod may be increased and taste of the tobacco may be improved. Also, the heat conductive material surrounding the tobacco rod 21 may function as a susceptor heated by the induction heater. Here, although not illustrated in the drawings, the tobacco rod 21 may further include an additional susceptor, in addition to the heat conductive material surrounding the tobacco rod 21.

The filter rod 22 may include a cellulose acetate filter. Shapes of the filter rod 22 are not limited. For example, the filter rod 22 may include a cylinder-type rod or a tube-type rod having a hollow inside. Also, the filter rod 22 may include a recess-type rod. When the filter rod 22 includes a plurality of segments, at least one of the plurality of segments may have a different shape.

Also, the filter rod 22 may include at least one capsule 23. Here, the capsule 23 may perform a function of generating flavor or aerosol. For example, the capsule 23 may have a configuration in which a liquid containing a flavoring material is wrapped with a film. The capsule 23 may have a spherical or cylindrical shape, but is not limited thereto.

Referring to FIG. 5, the cigarette 3 may further include a front end plug 33. The front end plug 33 may be located on one side of the tobacco rod 31 which is opposite to the filter rod 32. The front end plug 33 may prevent the tobacco rod 31 from being detached outwards and prevent the liquefied aerosol from flowing from the tobacco rod 31 into the aerosol generating device 1 (FIGS. 1 through 3), during smoking.

The filter rod 32 may include a first segment 321 and a second segment 322. Here, the first segment 321 may correspond to the first segment of the filter rod 22 of FIG. 4, and the second segment 322 may correspond to the third segment of the filter rod 22 of FIG. 4.

The diameter and total length of the cigarette 3 may correspond to those of the cigarette 2 of FIG. 4. For example, the length of the front end plug 33 is about 7 mm, the length of the tobacco rod 31 is about 15 mm, the length of the first segment 321 is about 12 mm, and the length of the second segment 322 is about 14 mm, but it is not limited thereto.

The cigarette 2 may be packaged by at least one wrapper 35. The wrapper 35 may have at least one hole through which external air may be introduced or internal air may be discharged. For example, the front end plug 33 may be packaged by a first wrapper 351, the tobacco rod 31 may be packaged by a second wrapper 352, the first segment 321 may be packaged by a third wrapper 353, and the second segment 322 may be packaged by a fourth wrapper 354. Also, the entire cigarette 3 may be repackaged by a fifth wrapper 355.

In addition, at least one perforation 36 may be formed in the fifth wrapper 355. For example, the perforation 36 may be formed in a region surrounding the tobacco rod 31, but is not limited thereto. The perforation 36 may serve to transfer heat generated by the heater 13 illustrated in FIGS. 2 and 3 to the inside of the tobacco rod 31.

In addition, at least one capsule 34 may be included in the second segment 322. Here, the capsule 34 may perform a function of generating flavor or a function of generating aerosol. For example, the capsule 34 may have a configuration in which a liquid containing a flavoring material is wrapped with a film. For example, the capsule 34 may have a spherical or cylindrical shape, but is not limited thereto.

In the embodiments described with reference to FIGS. 1 to 5, the solid type cigarette 3 is inserted into the aerosol generating device 1 and heated to generate an aerosol, but embodiments are not limited thereto. That is, the aerosol generating device 1 in the embodiment may include an aerosol generating article in a different form, such as a liquid tobacco material, e-vapor, vaporizer, CSV (Close System Vaporizer) e-cigarette, liquid e-cigarette, etc.

Figure 6:
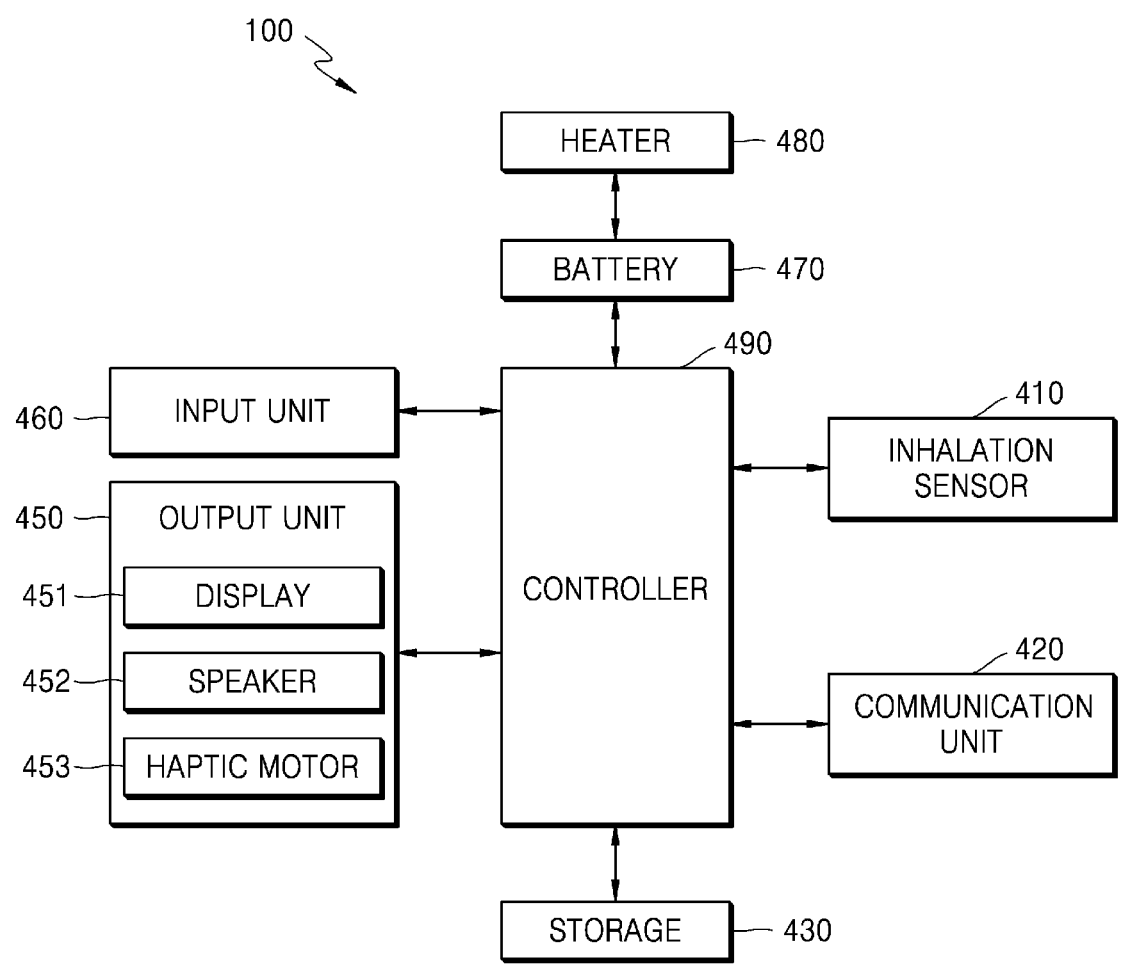
FIG. 6 is a block diagram of an aerosol generating device, according to an embodiment.

FIG. 6 is a block diagram of an aerosol generating device 100, according to an embodiment.

Referring to FIG. 6, the aerosol generating device 100 may include an inhalation sensor 410, a communication unit 420, a storage 430, an output unit 450, an input unit 460, a battery 470, a heater 480, and a controller 490. The battery 470 illustrated in FIG. 6 may correspond to the battery 11 of FIG. 3, and the heater 480 illustrated in FIG. 6 may correspond to the heater 13 of FIGS. 1 to 3. Therefore, redundant descriptions thereof will be omitted.

The aerosol generating device 100 detects user's inhalation, and compares first inhalation data corresponding to the user's inhalation amount with pre-stored second inhalation data to perform user authentication. Here, the user authentication may refer to age verification. The aerosol generating device 100 may activate itself only when it is determined that the user of the aerosol generating device 100 is an adult after comparing the first inhalation data and the second inhalation data (e.g., age-specific inhalation data). Therefore, if the aerosol generating device 100 determines that the user of the aerosol generating device 100 is not an adult (e.g., if the user is a minor who is under the age of 19), the aerosol generating device 100 may be deactivated to prohibit the use. In addition, the aerosol generating device 100 may activate itself only when it is determined that the user of the aerosol generating device 100 is an authorized user after comparing the inhalation data with normal person inhalation data. Therefore, if the user of the aerosol generating device 100 is an adult but has poor lung capacity or has a problem with lung based on the inhalation data, the aerosol generating device 100 may deactivate itself to prohibit the use. Hereinafter, embodiments of the present disclosure will be described in detail with reference to each component.

The inhalation sensor 410 detects the user's inhalation. Here, the inhalation sensor 410 may be embodied with a pressure sensor, a flow sensor, or a combination thereof. In addition, the inhalation sensor 410 may include a temperature sensor to adjust a pressure measurement value of the pressure sensor based on the temperature. The inhalation sensor 410 may be referred to as a puff sensor.

Figure 10:
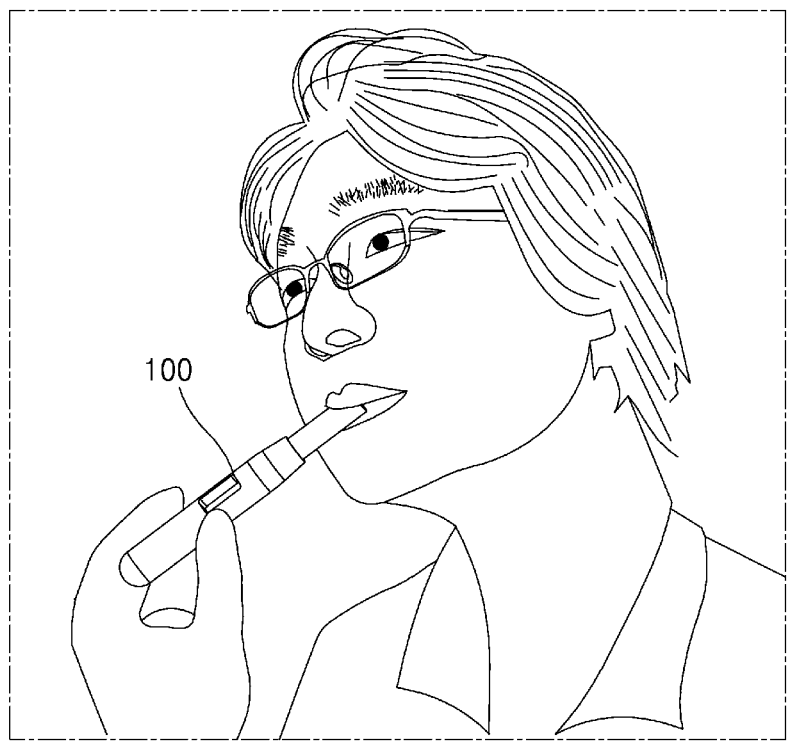
FIG. 10 is a diagram illustrating user authentication of the aerosol generating device, according to an embodiment.

The inhalation sensor 410 senses the user's inhalation and provides the controller 490 with the sensed data. For example, as shown in FIG. 10, when the user bites the aerosol generating device 100 and inhales an aerosol, the inhalation sensor 410 detects the user's inhalation. Here, user authentication may be performed in an authentication mode separate from an operation mode of the aerosol generating device 100, and an inhalation guide message for explaining the user authentication process may be displayed or output as a voice message through the output unit 450. For example, accuracy of measurement of the inhalation data may be increased through a message such as "please inhale strongly for 1 second for user authentication".

The communication unit 420 communicates with a user terminal (not shown). According to an embodiment, the communication unit 420 exchanges user authentication information with the user terminal. Here, the user terminal may be a mobile terminal or a smart phone, but is not limited thereto. The user terminal may any user terminal capable of performing short-range communication with the aerosol generating device 100.

The communication unit 420 may include a short-range communication unit. Examples of the short-range communication unit may include, but are not limited, a bluetooth communication unit, a bluetooth low energy (BLE) communication unit, a near field communication unit (NFC), a wireless fidelity local area network (WLAN) communication unit, a Zigbee communication unit, an infrared data association (IrDA) communication unit, a wireless fidelity (Wi-Fi) direct (WFD) communication unit, an ultra-wideband (UWB) communication unit, an Ant+ communication unit, and the like.

The storage 430 stores information for an operation of the aerosol generating device 100. According to an embodiment, the storage 430 may store information about age-specific lung capacity and age-specific inhalation data into a database. The storage 430 may also store the user authentication information.

The age-specific inhalation data may be calculated by using a forced vital capacity (FVC), a forced expiratory volume in one second (FEV1), a forced expiratory volume in six seconds (FEV6), and the like, which are methods of testing pulmonary functions based on a volume and a flow rate of air that a subject inhales and exhales over time.

For example, a table of correlations between FVC and age may be made to build the age-specific inhalation data. In addition, in order to improve accuracy, the age-specific inhalation data may be built by reflecting physical variables such as height, weight, and the like, if necessary.

The age-specific inhalation data may be obtained according to Equation 1 below.

$$FVC = -4.8434 - 0.00008633 * age^2 \text{ (year)} + 0.05292 * height \text{ (cm)} + 0.01095 * weight \text{ (kg)} \quad \text{[Equation 1]}$$

Here, when variables such as height and weight are excluded, it may be further simplified as shown in Equation 2 below.

$$FVC = -4.8434 - 0.00008633 * age^2 \text{ (year)} \quad \text{[Equation 2]}$$

According to an embodiment, it has been described that the age-specific inhalation data is calculated using a FVC model. However, embodiments of the present disclosure are not limited thereto, and various age-specific prediction models may be used.

The output unit 450 may include a display 451, a speaker 452, and a haptic motor 453 to output a notification to the user. The output unit 450 may output visual, auditory, and tactile information.

The display 451 may visually output various types of alarm messages generated by the aerosol generating device 100. For example, the display 451 may output a green light when a remaining capacity of the battery 470 is greater than or equal to predetermined reference remaining capacity, and may output an orange light when the remaining capacity of the battery 470 is less than the predetermined reference remaining capacity.

The speaker 452 may audibly output various types of alarm messages generated by the aerosol generating device 100. For example, when the remaining capacity of the battery 470 is greater than or equal to the predetermined reference remaining capacity, the speaker 452 may output a beep sound during a predetermined period of time, and when the remaining capacity of the battery 470 is less than the predetermined reference remaining capacity, the speaker 452 may output a beep sound at a predetermined cycle.

The haptic motor 453 may tactilely output various types of alarm messages generated by the aerosol generating device 100. For example, when the remaining capacity of the battery 470 is greater than or equal to the predetermined reference remaining capacity, the haptic motor 453 may output the first notification by vibrating during the predetermined period of time, and when the remaining capacity of the battery 470 is less than the predetermined reference remaining capacity, the haptic motor 453 may output the second notification by vibrating at the predetermined cycle.

The input unit 460 may receive a user input. For example, the input unit 460 may receive a user input to heat the heater 480. As another example, the input unit 460 may receive a user input to vary a display of the output unit 450.

The battery 470 may supply power to the heater 480, and an amount of power supplied to the heater 480 may be regulated by the controller 490.

When a current is applied to the heater 480, the heater 480 may generate heat by its specific resistance, and when an aerosol generating substrate is heated by the heater 480, an aerosol may be generated.

The controller 490 may control power supply to the heater 480 by transmitting a pulse width modulation (PWM) signal to the heater 480.

The controller 490 may heat the heater 480 when the aerosol generating substrate is inserted into a cavity within the predetermined period of time. To that end, the aerosol generating device 100 may further include a substrate detection sensor (not shown). According to an embodiment, the controller 490 may heat the heater 480 in response to opening of a cavity 150, or may heat the heater 480 in response to the user input received by the input unit 460.

The controller 490 compares first inhalation data obtained from the inhalation sensor 410 with second inhalation data stored beforehand in the storage 430, and performs user authentication according to a comparison result. When the first inhalation data (i.e., the user's inhalation amount measured by the inhalation sensor 410) is greater than or equal to a first threshold value among the second inhalation data, the controller 490 determines that the age verification is successful, and activates the aerosol generating device 100. Here, the first threshold value may be inhalation data corresponding to the age of 19. For example, the first threshold value may be 4.86 FVC (liters) according to the age-specific inhalation data stored in the storage 430. In this case, it may be determined that adult authentication is successful only when an inhalation amount sensed by the inhalation sensor 410 is 4.86 or greater.

In addition, the controller 490 may compare the first inhalation data with a second threshold value among the second inhalation data, and perform normal person authentication according to a comparison result. Here, the second threshold value may indicate an inhalation amount corresponding to lung capacity of a normal person. Therefore, even if adult authentication is completed, when the lung function is not good, it is possible to prohibit use of the aerosol generating device 100. For example, the use of the aerosol generating device 100 may be prohibited if the adult has lung capacity of an infant or an elderly.

Here, it has been described that the controller 490 determines based on the inhalation data pre-stored in the storage 430. However, after setting a reference value of adult inhalation data in internal memory, for example cache of the controller 490, the controller 490 may directly determine whether the inhalation data obtained from the inhalation sensor 410 is greater than or equal to the reference value to activate or deactivate the aerosol generating device 100.

In addition, the controller 490 may analyze the first inhalation data obtained from the inhalation sensor 410 to generate inhalation pattern data including a inhalation cycle, inhalation intensity, or the like. The controller 490 may perform user authentication by comparing the user's inhalation pattern corresponding to the generated inhalation pattern data with the inhalation pattern data stored beforehand in the storage 430. Here, user authentication may include identity verification. The controller 490 may perform at least one of age verification using the age-specific inhalation data, and identity verification using the inhalation pattern data. Therefore, even if age verification is successful, the aerosol generating device 100 may not be activated if the identity verification fails. As such, unauthorized use of the aerosol generating device by minors or others may be prevented.

Figure 7:
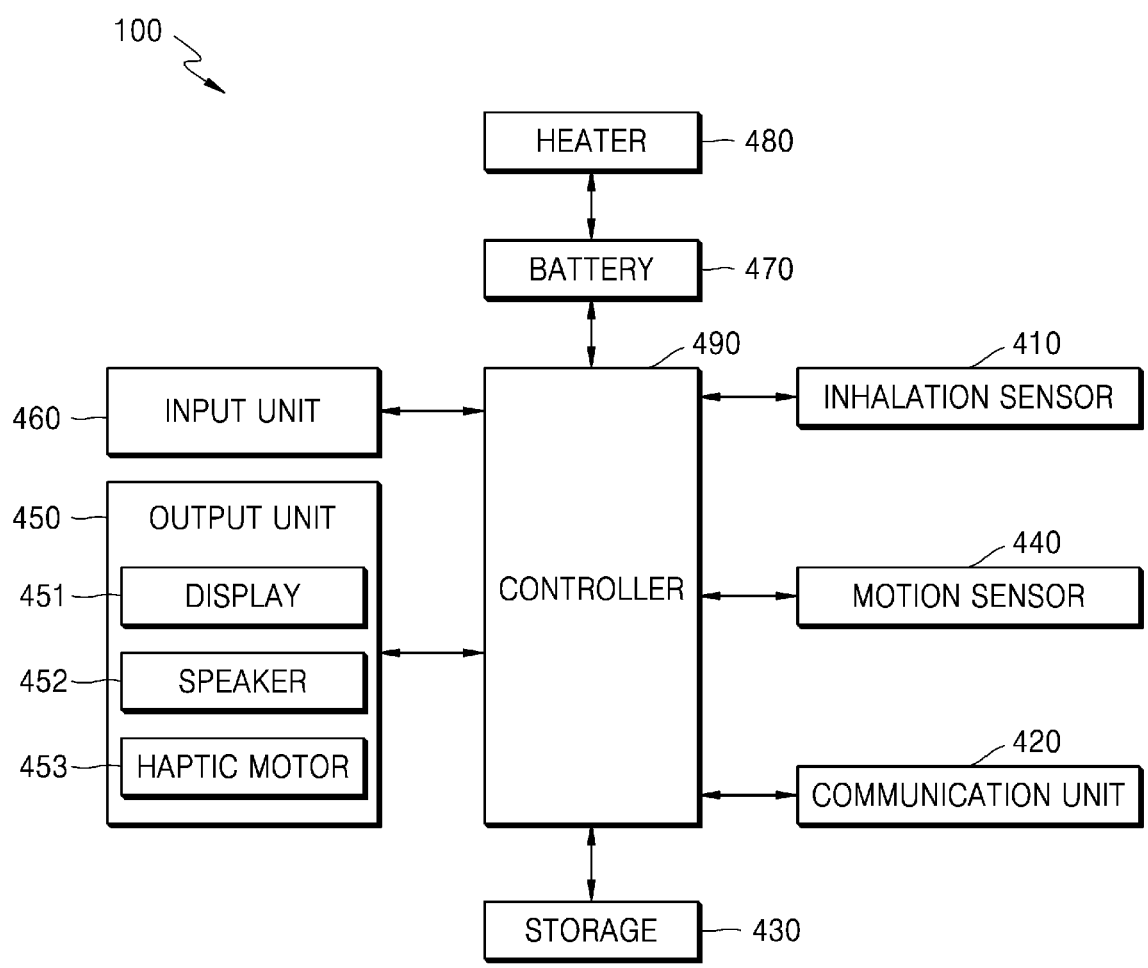
FIG. 7 is a block diagram of the aerosol generating device, according to another embodiment.

FIG. 7 is a block diagram of the aerosol generating device 100, according to another embodiment.

Referring to FIG. 7, the aerosol generating device 100 further includes a motion sensor 440 compared to the aerosol generating device 100 illustrated in FIG. 6. Here, descriptions will focus on user authentication using the motion sensor 440.

Figure 11:
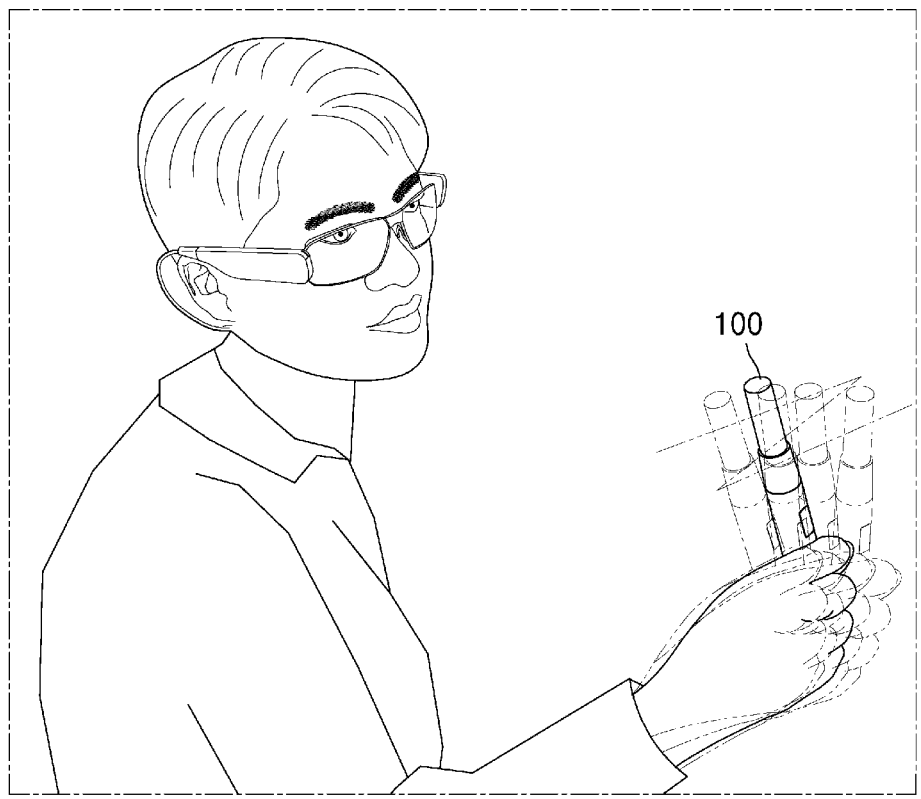
FIG. 11 is a diagram illustrating user authentication of the aerosol generating device 100, according to another embodiment.

The motion sensor 440 may detect a motion of the aerosol generating device 100. Examples of the motion sensor 440 may include, but are not limited to, an acceleration sensor, a gyro sensor, an angular velocity sensor, and the like. Here, the motion sensor 440 may recognize a predetermined motion pattern. For example, the motion sensor 440 may recognize a motion pattern when a user holds the aerosol generating device 100 in his or her hand and draws a letter Z as shown in FIG. 11.

The controller 490 may compare motion data obtained from the motion sensor 440 with motion data for identity verification stored in the storage 430, and activate the aerosol generating device 100 only when the two data match. The controller 490 may perform at least one of age verification using the age-specific inhalation data, and identity verification using the inhalation pattern data, and identity verification using the motion pattern.

Figure 8:
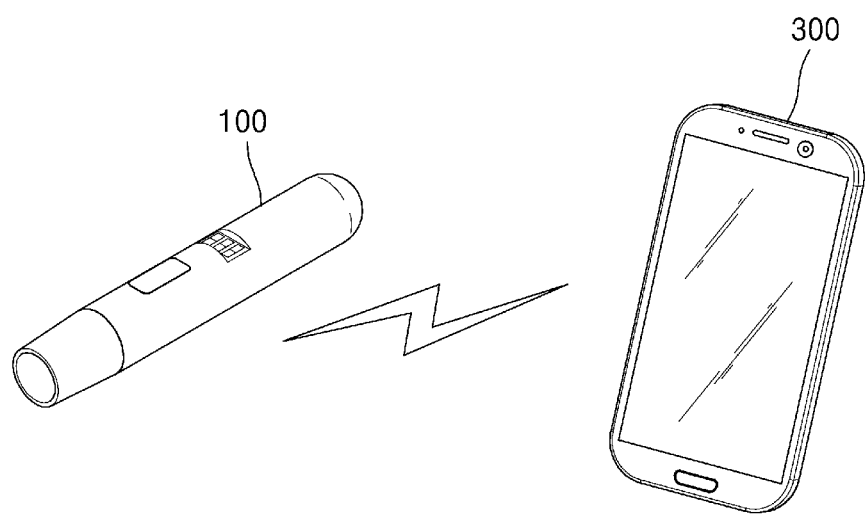
FIGS. 8 to 9 are diagrams illustrating user authentication between the aerosol generating device and a user terminal, according to another embodiment.
Figure 9:
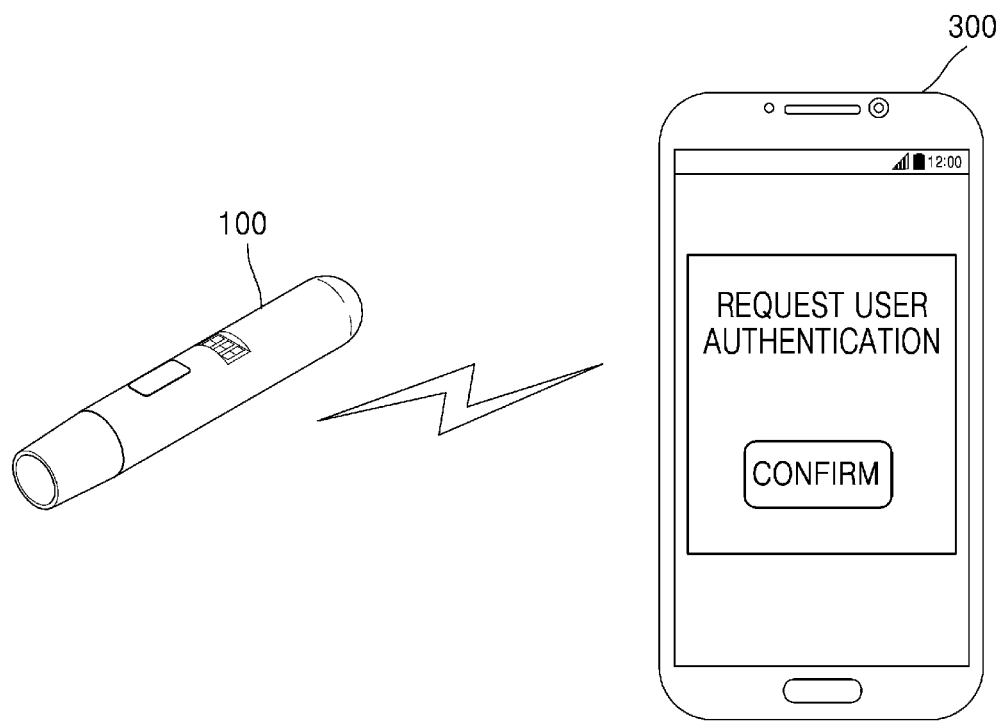

FIGS. 8 and 9 are diagrams illustrating user authentication between the aerosol generating device 100 and a user terminal 300, according to another embodiment.

Referring to FIGS. 6 and 8, the aerosol generating device 100 and the user terminal 300 may perform short-range communication and perform user authentication using the user terminal 300 according to an embodiment.

As described above with reference to FIG. 6, the aerosol generating device 100 may perform short-range communication with the user terminal 300 through the communication unit 420.

When user authentication (e.g., age verification or identity verification) using inhalation data obtained from the inhalation sensor 410 fails, the controller 490 transmits, through the communication unit 420, an authentication control command to the user terminal 300.

In addition, optionally, a user may execute a user authentication application of the user terminal 300. If the aerosol generating device 100 is present within a certain distance from the user terminal 300, the user may perform user authentication on the user terminal 300, such as fingerprint recognition, security key input, or the like.

As illustrated in FIG. 9, according to the authentication control command transmitted from the aerosol generating device 100, the user authentication application is executed in the user terminal 300 to perform user authentication. Examples of the user authentication performed in the user terminal 300 may include, but are not limited to, i-PIN authentication, public authentication, mobile phone number authentication, biometric information authentication, and the like.

User authentication may not be accurate if inhalation data obtained from the inhalation sensor 410 of the aerosol generating device 100 is used alone. Thus, according to an embodiment, when user authentication according to the FVC measurement fails at the aerosol generating device 100, the aerosol generating device 100 may transmit the inhalation data to the user terminal 300. Then, the user terminal 300 may perform user authentication by combining the transmitted inhalation data and pre-stored user information, such as user age information, user body information, and the like. In this case, the user authentication application driven in the user terminal 300 may perform user authentication through a simple lung function test based on the transmitted inhalation data.

When authentication is successful in the user terminal 300, the controller 490 performs user authentication according to authentication information transmitted from the user terminal 300 to activate the aerosol generating device 100. Here, the authentication information may indicate whether the user authentication (i.e., identity verification and/or age verification information) performed by the user terminal 300 was successful. The authentication information may be encrypted before transmission.

According to an embodiment, even if user authentication using the inhalation data measured by an inhalation sensor of the aerosol generating device 100 fails, the aerosol generating device 100 may perform user authentication by an additional authentication method through the user terminal 300. Therefore, user inconvenience caused by the authentication failure of the aerosol generating device 100 may be reduced.

In addition, according to an embodiment, even if authentication using the inhalation data is successful, the aerosol generating device 100 may be activated only when further authentication using a user terminal is completed. Accordingly, the protection by the user authentication may be enhanced, and a risk of authentication error may be reduced.

FIGS. 12 to 15 are flowcharts illustrating a method of controlling an aerosol generating device, according to different embodiments.

Figure 12:
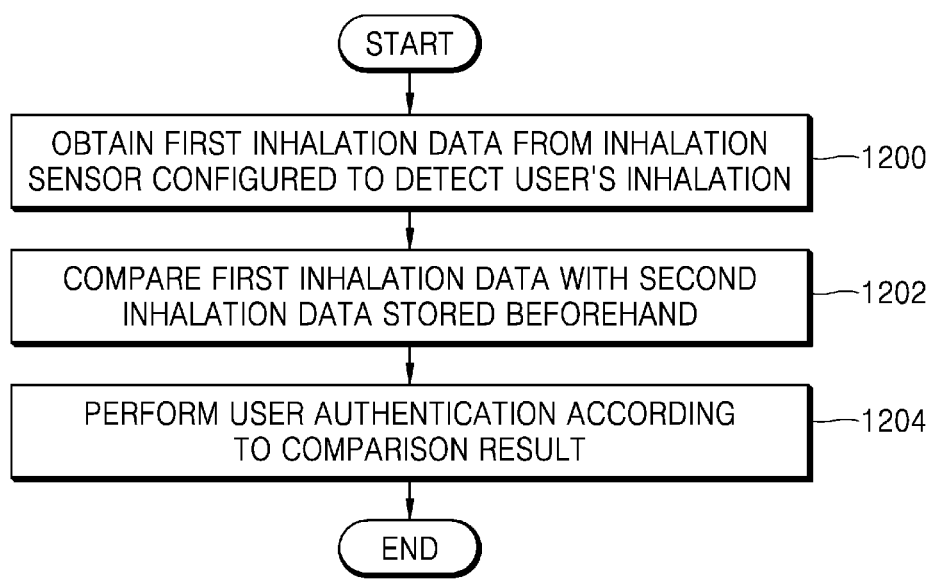
FIGS. 12 to 15 are flowcharts of a method of controlling an aerosol generating device, according to different embodiments.

Referring to FIG. 12, first inhalation data from an inhalation sensor configured to detect user's inhalation is obtained, in operation 1200. The controller compares the first inhalation data with the pre-stored second inhalation data, in operation 1202. User authentication is performed according to a comparison result, in operation 1204. Although not shown, when the user authentication is successful, the aerosol generating device 100 may be activated.

Figure 13:
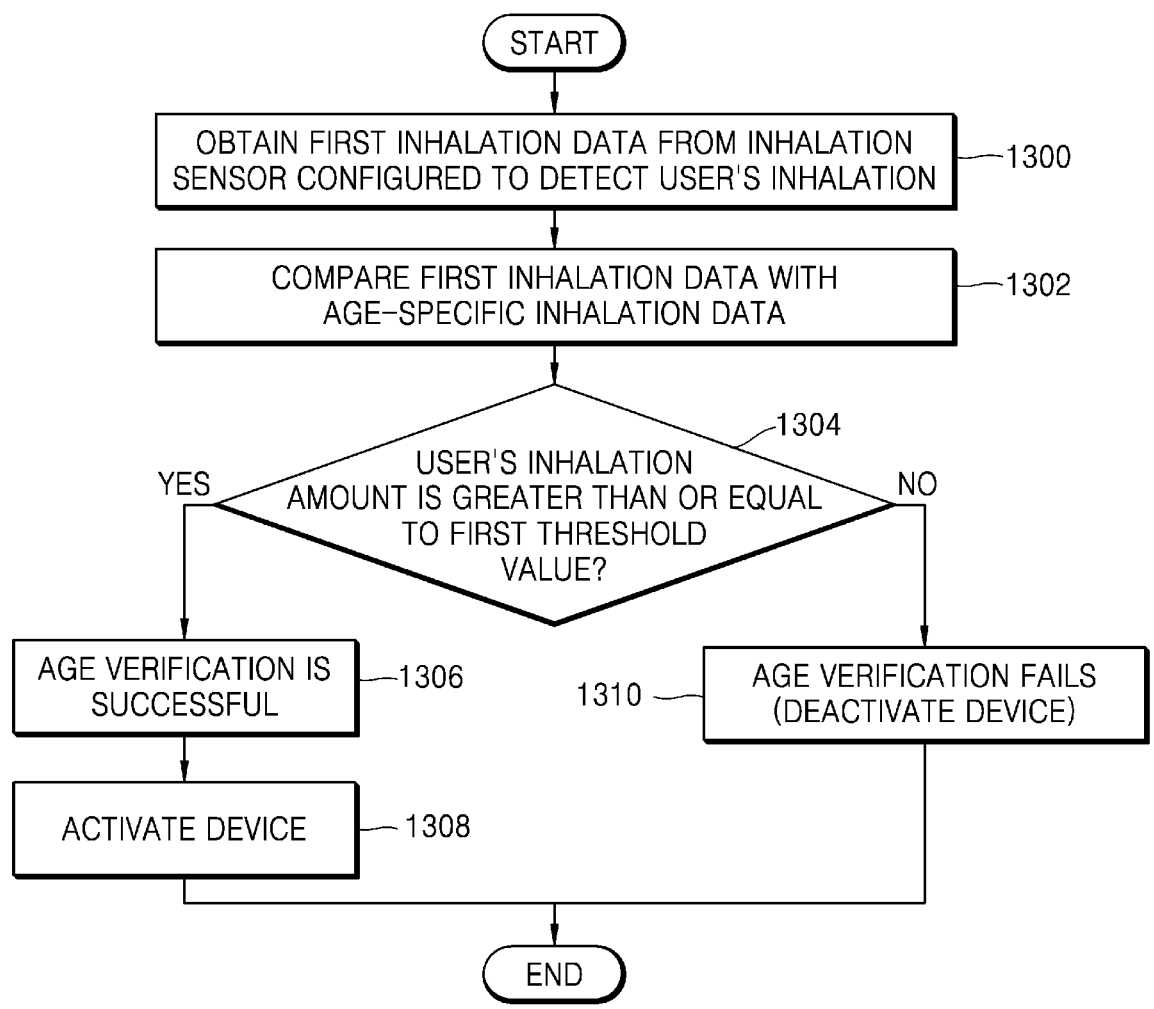

Referring to FIG. 13, the first inhalation data is obtained from the inhalation sensor configured to detect the user's inhalation, in operation 1300. The first inhalation data and age-specific inhalation data are compared with each other, in operation 1302. It is determined whether the inhalation amount corresponding to the first inhalation data is greater than or equal to a first threshold value, in operation 1304. Here, the first threshold value may be a reference inhalation amount corresponding to a specific age based on the age-specific inhalation data. For example, the first threshold value may be average inhalation amount corresponding to the age of 19. When age verification is successful, the aerosol generating device 100 is activated, in operations 1306 and 1308.

When the age verification fails, the aerosol generating device 100 is deactivated, in operation 1310.

Figure 14:
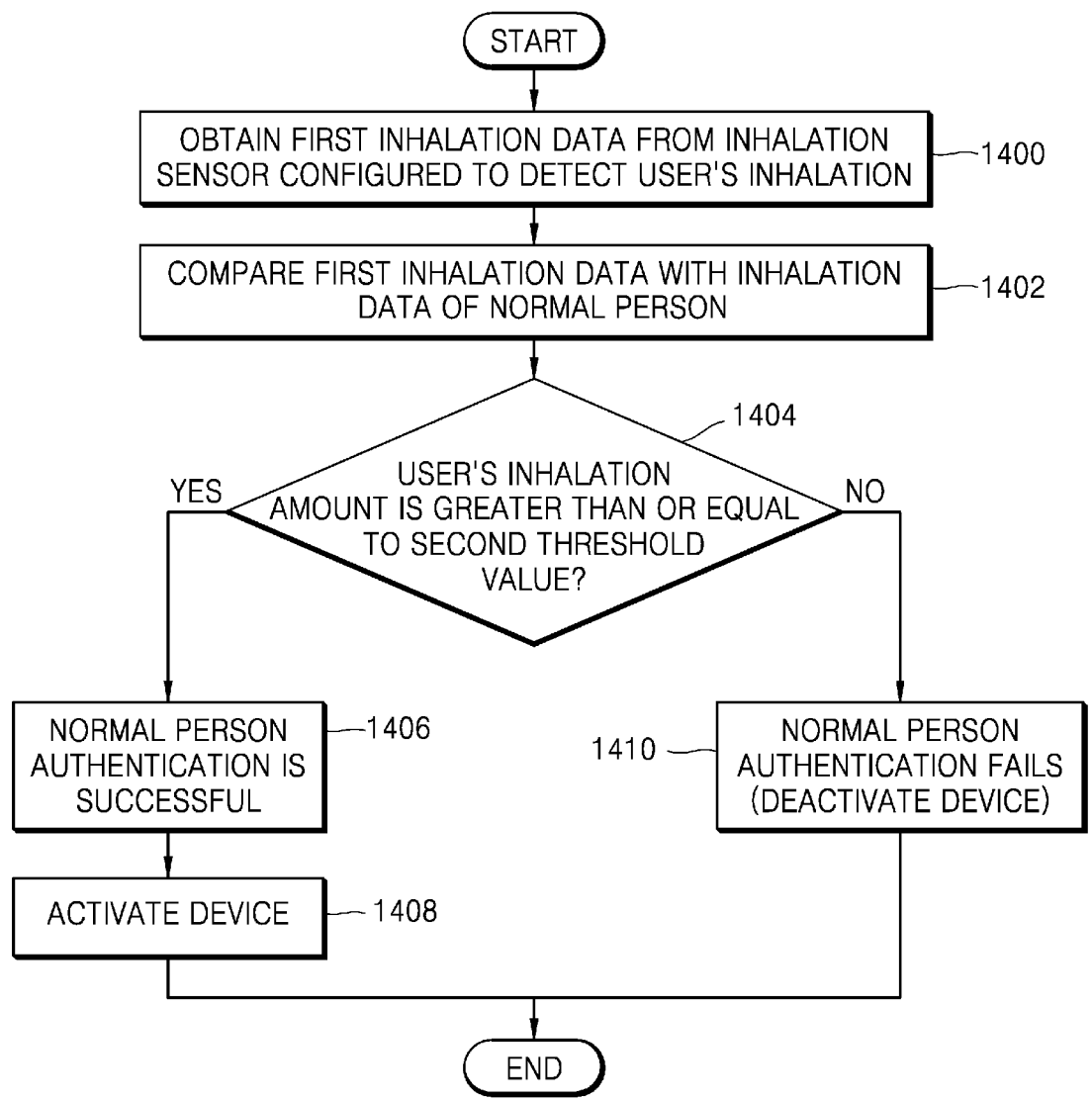

Referring FIG. 14, the first inhalation data is obtained from the inhalation sensor configured to detect the user's inhalation, in operation 1400. The first inhalation data and normal person inhalation data are compared with each other, in operation 1402. It is determined whether the measured inhalation amount corresponding to the first inhalation data is greater than or equal to a second threshold value, in operation 1404. Here, the second threshold value may be a reference inhalation amount of a normal person or a healthy person. When normal person authentication is successful, the aerosol generating device 100 is activated, in operations 1406 and 1408.

When the normal person authentication fails, the aerosol generating device 100 is deactivated, in operation 1410.

Figure 15:
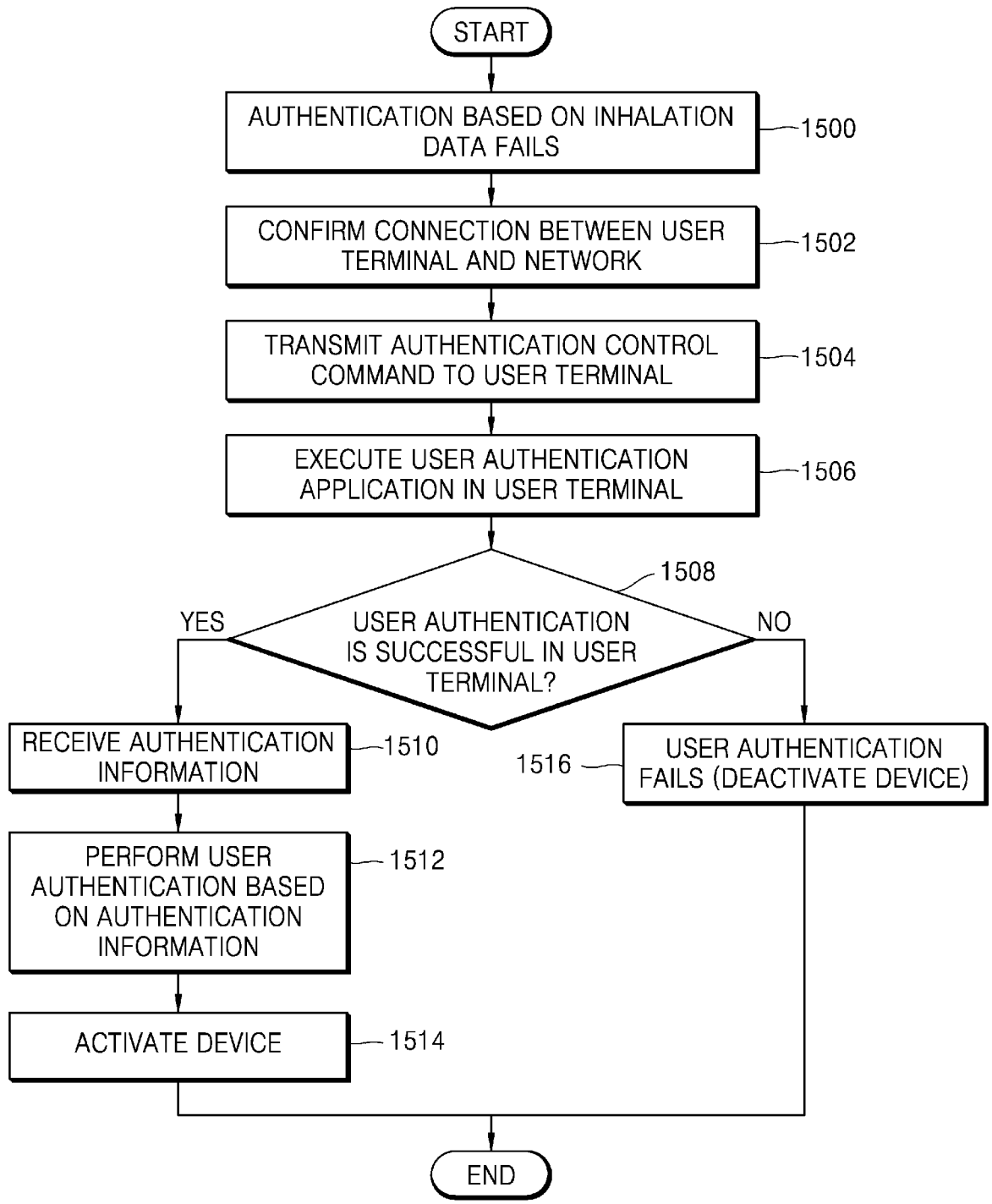

Referring to FIG. 15, in operations 1500 and 1502, when authentication based on the inhalation data fails, the connection between the user terminal and the aerosol generating device is checked. For example, when user authentication fails within the aerosol generating device 100, it is checked whether the user terminal is within a certain distance, for example, within a distance in which short-range communication is possible. An authentication control command is transmitted from the aerosol generating device to the user terminal, in operation 1504. User authentication application is executed in the user terminal, in operation 1506. When the user authentication is successful in the user terminal in operation 1508, the aerosol generating device 100 receives authentication information from the user terminal in operation 1510. Then, the aerosol generating device 100 performs user authentication based on the received authentication information in operation 1512. For example, if the authentication information indicates that the user authentication is successful at the user terminal, the aerosol generating device 100 may proceed to operation 1514. When the user authentication is successful, the aerosol generating device 100 is activated, in operation 1514.

When the user authentication fails in the user terminal, the authentication application may be terminated, or information on the authentication failure may be transmitted to the aerosol generating device 100, in operation 1516.

According to an embodiment, activation of the aerosol generating device 100 after successful user authentication may include opening or closing of a cavity into which an aerosol generating substrate is inserted, preheating a heater, and/or setting the aerosol generating device 100 to an operation mode.

According to an embodiment, the user authentication may be performed by an identity verification process and/or an age verification process. In the age verification process, inhalation data sensed from user's inhalation may be compared with age-specific inhalation data. In the identity verification process, inhalation pattern data generated based on the inhalation data sensed from the user's inhalation may be compared with pre-stored inhalation pattern data. Also, in the identity verification process, a motion pattern of a device may be compared with a pre-stored motion pattern. In addition, the user authentication may be performed through a user terminal that is connected to the aerosol generating device via a network.

According to an embodiment, one or more the above-described authentication methods may be performed. For example, in order to enhance security, multiple authentication processes may be performed sequentially, and the aerosol generating device may not be activated until after the user passes every authentication process. In this case, when prior authentication is successful, next authentication may be performed.

Alternatively, according to another embodiment, even if one authentication process fails, the user may try another authentication process to activate the aerosol generating device. In this case, the aerosol generating device may be activated as long as the user passes one of multiple authentication processes.

The descriptions of the above-described embodiments are merely examples, and it will be understood by one of ordinary skill in the art that various changes and equivalents thereof may be made. The disclosed methods should be considered in a descriptive sense only and not for purposes of limitation. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:
an inhalation sensor configured to detect user's inhalation;
a communication unit configured to communicate with a user terminal; and
a controller configured to compare first inhalation data obtained from the inhalation sensor with second inhalation data that is pre-stored, and perform user authentication according to a comparison result,
wherein the controller is further configured to transmit, through the communication unit, an authentication control command comprising the first inhalation data to the user terminal when the user authentication fails such that a user authentication application is executed in the user terminal according to the authentication control command,
wherein the controller is further configured to receive authentication information from the user terminal through the communication unit, and perform the user authentication based on the authentication information transmitted from the user terminal,
wherein the authentication information indicates whether additional user authentication performed by the user authentication application based on the first inhalation data and user information stored in the user terminal is successful, and
wherein the controller is further configured to, based on the user authentication being successful, activate the aerosol generating device and perform at least one of opening a cavity into which an aerosol generating substrate is inserted, closing the cavity, preheating a heater, or setting of the aerosol generating device to an operation mode.

2. The aerosol generating device of claim 1, wherein
the second inhalation data comprises age-specific inhalation data indicating a reference inhalation amount for a certain age, and
the controller is further configured to compare user's inhalation amount corresponding to the first inhalation data with the reference inhalation amount, and activate the aerosol generating device based on the user's inhalation amount being greater than the reference inhalation amount.

3. The aerosol generating device of claim 1, wherein
the second inhalation data comprises inhalation data indicating a reference inhalation amount for an adult human, and
the controller is further configured to compare user's inhalation amount corresponding to the first inhalation data with the reference inhalation amount, and activate the aerosol generating device based on the user's inhalation amount being greater than or equal to the reference inhalation amount.

4. The aerosol generating device of claim 1, the communication unit receives the authentication information from the user terminal via short-range communication.

5. The aerosol generating device of claim 1, wherein
the first inhalation data comprises inhalation pattern data indicating at least one of inhalation cycle and inhalation intensity, and the controller is further configured to perform the user authentication based on whether the at least one of inhalation cycle and inhalation intensity matches the second inhalation data.

6. The aerosol generating device of claim 1, wherein the inhalation sensor comprises at least one of a pressure sensor and a flow sensor.

7. The aerosol generating device of claim 1,
wherein the controller is further configured to perform at least two user authentications from among:
first user authentication that compares user's inhalation amount corresponding to the first inhalation data with the second inhalation data,
second user authentication that compares user's inhalation pattern corresponding to the first inhalation data with the second inhalation data,
third user authentication that compares a motion of the aerosol generating device with pre-stored motion data, and
fourth user authentication that is performed based on the authentication information transmitted from the user terminal, which indicates a result of user authentication performed by a user authentication application of the user terminal based on the first inhalation data.

8. The aerosol generating device of claim 1,
wherein the controller is further configured to perform at least two user authentications from among:
first user authentication that compares user's inhalation amount corresponding to the first inhalation data with the second inhalation data,
second user authentication that compares user's inhalation pattern corresponding to the first inhalation data with the second inhalation data,
third user authentication that compares a motion of the aerosol generating device with pre-stored motion data, and
fourth user authentication that is performed based on the authentication information transmitted from the user terminal, which indicates a result of user authentication performed by a user authentication application of the user terminal based on the first inhalation data, and
wherein the controller is further configured to, when one of the at least two user authentications is successful, perform another user authentication.

9. The aerosol generating device of claim 1,
wherein the controller is further configured to perform at least two user authentications from among:
first user authentication that compares user's inhalation amount corresponding to the first inhalation data with the second inhalation data,
second user authentication that compares user's inhalation pattern corresponding to the first inhalation data with the second inhalation data,
third user authentication that compares a motion of the aerosol generating device with pre-stored motion data, and
fourth user authentication that is performed based on the authentication information transmitted from the user terminal, which indicates a result of user authentication performed by a user authentication application of the user terminal based on the first inhalation data, and
wherein the controller is further configured to, when one of the at least two user authentications fails, perform another user authentication.

10. The aerosol generating device of claim 1, wherein the user authentication is performed in an authentication mode of the aerosol generating device.

11. The aerosol generating device of claim 1, further comprising a motion sensor configured to detect a motion of the aerosol generating device, and
the controller is further configured to perform the additional user authentication based on whether the motion matches a pre-stored motion data.

* * * * *